(12) United States Patent
Choi et al.

(10) Patent No.: US 7,982,839 B2
(45) Date of Patent: Jul. 19, 2011

(54) FRINGE FIELD SWITCHING MODE LIQUID CRYSTAL DISPLAY AND MANUFACTURING METHOD THEREOF

(75) Inventors: Suk Choi, Icheon-Si (KR); Seung Jun Baek, Icheon-Si (KR); Soon Ju Jang, Icheon-Si (KR); Tae Hyun Jun, Icheon-Si (KR); Hyang Yul Kim, Icheon-Si (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 1155 days.

(21) Appl. No.: 11/725,952

(22) Filed: Mar. 20, 2007

(65) Prior Publication Data
US 2008/0180624 A1 Jul. 31, 2008

(30) Foreign Application Priority Data

Jan. 29, 2007 (KR) .................. 10-2007-0009158

(51) Int. Cl.
*G02F 1/1343* (2006.01)
(52) U.S. Cl. ........................ 349/141; 349/139
(58) Field of Classification Search .............. None
See application file for complete search history.

(56) References Cited

U.S. PATENT DOCUMENTS

| | | | |
|---|---|---|---|
| 6,226,118 B1 | 5/2001 | Koyama et al. | |
| 6,236,081 B1 | 5/2001 | Fukumoto | |
| 6,570,631 B2 * | 5/2003 | Ko | 349/43 |
| 6,573,955 B2 * | 6/2003 | Murade | 349/44 |
| 6,809,789 B2 * | 10/2004 | Kim et al. | 349/139 |
| 2004/0227875 A1 | 11/2004 | Park et al. | |
| 2006/0187391 A1 * | 8/2006 | Hwang | 349/114 |

FOREIGN PATENT DOCUMENTS

KR 1020060117465 A 11/2006
KR 100666236 B1 1/2007

OTHER PUBLICATIONS

S.J. Jang et al., "The Superior Readability and Ultra Low Power Consumption of MAFFS LCD by the New Design," Journal of the SID 6 Digest, Jun. 6, 2006, p. 744-747 (Poster P-142).

(Continued)

*Primary Examiner* — Richard H Kim
(74) *Attorney, Agent, or Firm* — The Webb Law Firm

(57) ABSTRACT

Provided is a fringe field switching mode liquid crystal display. The fringe field switching mode liquid crystal display includes a transparent common electrode having a predetermined shape and formed within the pixel area to adjust light transmittance by applying a voltage to the liquid crystal layer, and a transparent pixel electrode having a plurality of slits and formed above the transparent common electrode with an insulating layer interposed between the transparent common electrode and the transparent pixel electrode. A rubbing direction for aligning the liquid crystal layer is within 5° with respect to a direction of the gate line to remove a light shielding region above the data line, one end of the transparent common electrode is arranged between the data line and the transparent pixel electrode, and a distance between the transparent common electrode and the transparent pixel electrode is regulated with respect to the data line.

11 Claims, 14 Drawing Sheets

OTHER PUBLICATIONS

Kyung Ha Lee et al., "A Novel Outdoor Readability of Portable TFT-LCD with AFFS Technology," Journal of the SID 6 Digest, Jun. 6, 2006, p. 1079-1082, (Session 16.1).

B.H. Kim et al., "i-LCD Technology of AFFS Tablet for Superior Outdoor Readability," IDW 2006, Dec. 6, 2006, (Poster LCT P3-26L).

Hyang Yul Kim et al., "A Novel Portable LCD Using a New AFFS Technology for Outdoor Readability," Journal of the SID 6 Digest, Dec. 2006, p. 1077-1088, vol. 14, Issue 12.

S.J. Baek at al., "Novel Pixel Design of Advanced FFS Tablet for High Aperture Ratio and Superior Outdoor Readability," at 2006 CFC (China Flat Panel display conference), Sep. 21-22, 2006, (Poster Session).

* cited by examiner

RUBBING DIRECTION OF LIQUID CRYSTAL (0°~5°)

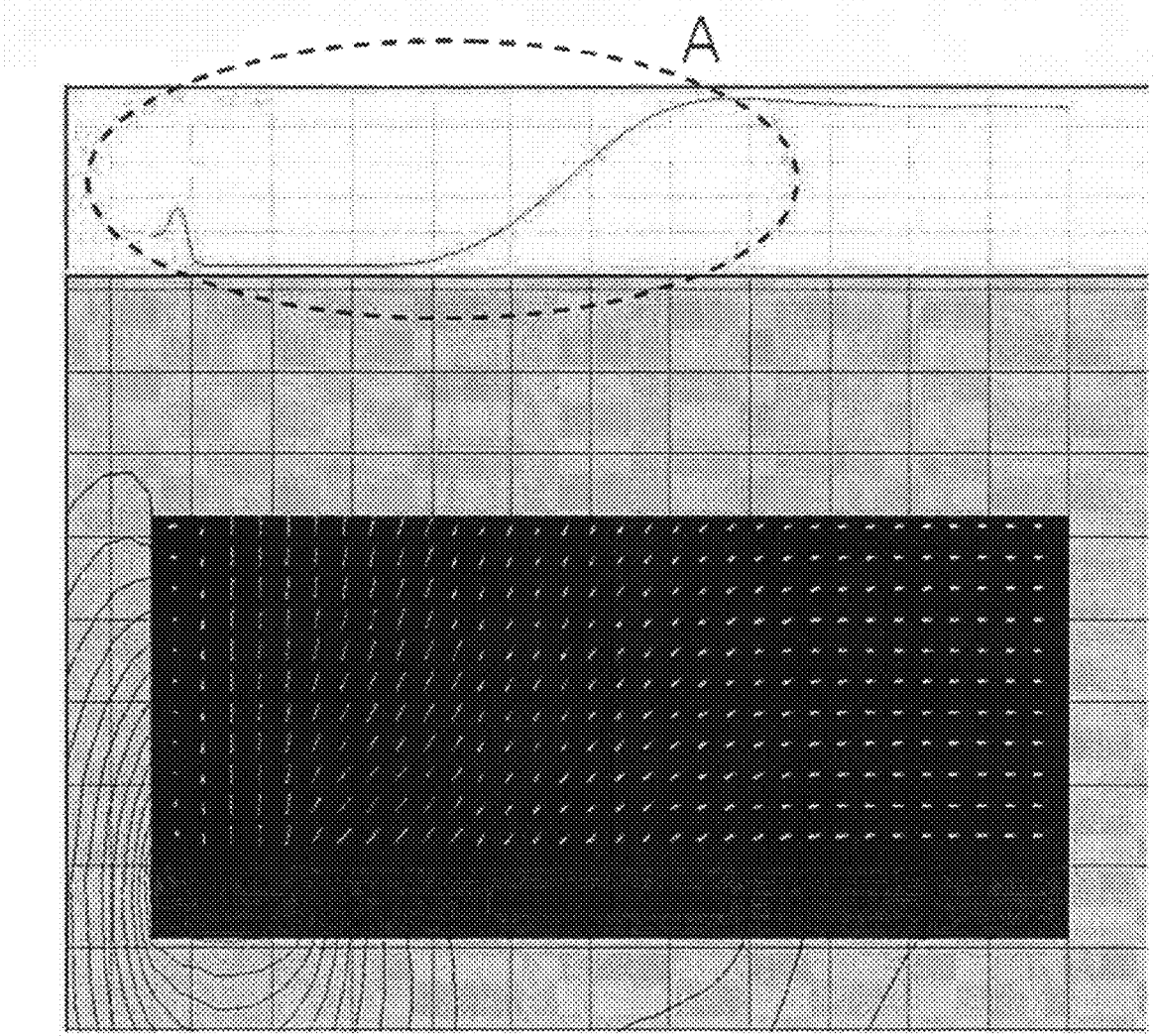

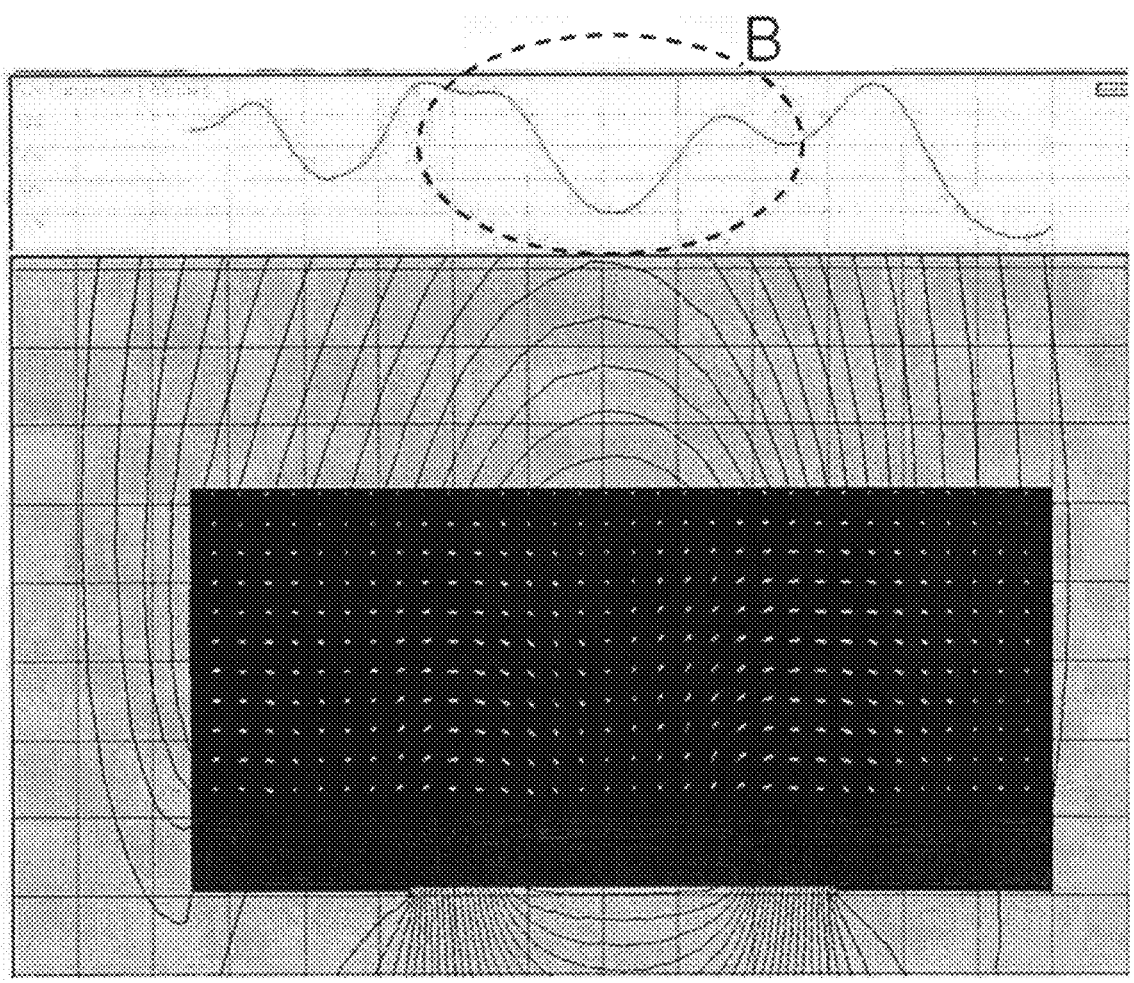

FRINGE FIELD SWITCHING MODE LIQUID CRYSTAL DISPLAY AND MANUFACTURING METHOD THEREOF

BACKGROUND OF THE INVENTION

1. Field of the Invention

The present invention relates to a fringe field switching (FFS) mode liquid crystal display and a manufacturing method thereof, in which an aperture ratio is improved to decrease power consumption and internal reflection is increased to enhance outdoor readability.

2. Description of the Related Art

A fringe field switching (FFS) mode liquid crystal display (LCD) has been proposed to improve low aperture and transmittance of an in plane switching (IPS) mode LCD.

In the FFS mode LCD, a common electrode and a pixel electrode are made of a transparent conductive layer such as indium tin oxide (ITO) or the like to thereby improve its aperture ratio and transmittance as compared with the IPS mode LCD, and a fringe field is formed in a narrow interval between the common electrode and the pixel electrode to thereby further enhance the transmittance as even liquid crystal molecules above the electrodes are all controlled. For example, there are conventional FFS mode LCDs disclosed in U.S. Pat. Nos. 6,256,081 and 6,226,118, which are filed by the same present applicant.

In the meantime, the LCD is classified into a transmissive LCD using backlight and a reflective LCD using natural light. The transmissive LCD uses the backlight as a light source, so that it can display an image brightly even in dark surroundings but the backlight causes high power consumption and bad outdoor readability. On the other hand, the reflective LCD uses its surrounding natural light without the backlight, so that it can consume less power and be used in the outdoor place but it is of no use when the surroundings are dark.

In other words, the general transmissive LCD is excellent in brightness, color reproduction, contrast ration (CR), etc. as to an indoor place, but it is almost impossible to read information from the LCD because of sunlight or reflected sunlight as to the outdoor place. Due to the sunlight stronger than one hundred thousand LUX in the outdoor place, the transmissive LCD which cannot emit light by itself is deteriorated in the outdoor readability because it depends on the brightness of the backlight and the transmittance of an LCD panel. To solve this problem, it is possible to increase the brightness of the backlight, but too much power consumption is required.

Accordingly, there has been proposed a semi-transmissive LCD to solve the shortcomings of both transmissive and reflective LCDs. The semi-transmissive LCD is compatible between the reflective type and the transmissive type, so that it can consume relatively less power and be used in the dark surroundings. Such a semi-transmissive LCD has been disclosed in Korean Patent No. 666236, filed by the same present applicant.

In general, the semi-transmissive LCD has been designed to have a single cell gap structure in which a cell gap of a transmissive region is equal to that of a reflective region, or a dual cell gap structure in which the cell gap of the transmissive region is two times larger than that of the reflective region. However, when the semi-transmissive LCD is manufactured in the single cell gap structure using the same liquid crystal mode, a phase lag of the reflective region is twice that of the transmissive region, so that a voltage-reflective (V-R) curve of a reflective mode is not matched with a voltage-transmittance (V-T) curve of a transmissive mode, thereby causing inharmonious gradation and deteriorating electro-optical properties.

Accordingly, there is being manufactured a semi-transmissive LCD with the dual cell gap structure in which a transmissive region is designed to have a cell gap two times larger than that of a reflective region. In this manner, the V-R curve of the reflective mode can be matched with the V-T curve of the transmissive mode. However, if the semi-transmissive LCD is manufactured with the dual cell gap structure, stepped difference due to the cell gap between the reflective regions increases twice, so that there are difficulties in a manufacturing process, for example, non-uniform liquid crystal alignment or the like, thereby lowering productivity. Further, the semi-transmissive LCD shows a remarkably reduction in aperture ratio at the indoor place as well as its manufacturing process is complicated and difficult.

Meanwhile, the same present applicant has proposed a semi-transmissive FFS mode LCD to use both advantages of the FFS mode LCD and the semi-transmissive LCD. Such a semi-transmissive FFS mode LCD has been disclosed in Korean Patent Publication No. 2006-117465.

However, when the semi-transmissive mode is applied to the FFS mode LCD, a resin process is necessary to form a convex-concave part for increasing the reflectivity. The resin process is difficult because it cannot perfectly avoid basic contamination on the manufacturing process, and is expensive. Further, to realize the FFS mode LCD in the semi-transmissive mode, development of a compensation film, a polarization film, etc. should be preceded in association with the structure of the semi-transmissive FFS mode LCD. In other words, cost and time for development are much required.

Under the foregoing background, researches are required for employing some properties of the semi-transmissive mode LCD, such as outdoor readability or the like, while maintaining the process of manufacturing a general transmissive FFS mode LCD.

SUMMARY OF THE INVENTION

In consideration of the above problems, it is an object of the present invention to provide a fringe field switching (FFS) mode liquid crystal display (LCD) and a manufacturing method thereof, in which outdoor readability is enhanced using basic properties of the FFS mode LCD without largely changing a process of a general transmissive FFS mode LCD.

It is another object of the present invention to provide a fringe field switching (FFS) mode liquid crystal display (LCD), in which an aperture ratio is enhanced and light leakage and coupling effect are minimized, thus improving picture quality.

It is still another object of the present invention to provide a fringe field switching (FFS) mode liquid crystal display (LCD), of which internal reflection is increased.

It is yet another object of the present invention to provide a fringe field switching (FFS) mode liquid crystal display (LCD), which has a higher aperture ratio than the conventional transmissive FFS mode LCD, thereby reducing power consumption.

In order to achieve the above objects, according to one aspect of the present invention, a fringe field switching mode liquid crystal display comprising a lower substrate, an upper substrate, and a liquid crystal layer interposed between the lower and upper substrates, in which a gate line and a data line intersect each other and define a pixel area on the lower substrate and a switching element is provided at an intersection between the gate line and the data line, comprises: a transparent common electrode having a predetermined shape and formed within the pixel area to adjust light transmittance by applying a voltage to the liquid crystal layer; and a transparent pixel electrode comprising a plurality of slits and formed above the transparent common electrode with an insulating layer interposed between the transparent common electrode and the transparent pixel electrode, wherein a rubbing direction for aligning the liquid crystal layer ranges within 5° with respect to a direction of the gate line, arrangement between the transparent common electrode and the transparent pixel electrode is regulated with respect to the data line to reduce light leakage and coupling phenomena without a light shielding region above the data line, and one end of the transparent common electrode is arranged between the data line and the transparent pixel electrode.

A ratio (L3/L1) of a distance (L1) between the data line and the transparent pixel electrode to a distance (L3) between the data line and the transparent common electrode may be within 0.75, and the distance between the data line and the transparent pixel electrode may be within 4 μm.

According to another aspect of the present invention, a fringe field switching mode liquid crystal display comprising a lower substrate, an upper substrate, and a liquid crystal layer interposed between the lower and upper substrates, in which a gate line and a data line intersect each other and define a pixel area on the lower substrate and a switching element is provided at an intersection between the gate line and the data line, comprises: a transparent common electrode having a predetermined shape and formed within the pixel area to adjust light transmittance by applying a voltage to the liquid crystal layer; and a transparent pixel electrode comprising a plurality of slits and formed above the transparent common electrode with an insulating layer interposed between the transparent common electrode and the transparent pixel electrode, wherein a light shielding region is removed above the data line and the gate line, and an electrically independent reflective structure is formed of the same material as the data line and formed on the gate line.

According to yet another aspect of the present invention, a method of manufacturing a fringe field switching mode liquid crystal display comprising a lower substrate, an upper substrate, and a liquid crystal layer interposed between the lower and upper substrates, in which a gate line and a data line intersect each other and define a pixel area on the lower substrate and a switching element is provided at an intersection between the gate line and the data line, comprises: forming a transparent common electrode on the substrate; sequentially forming the gate line, a gate insulating layer, an active layer, the data line, an interlayer insulating layer and a transparent pixel electrode having a plurality of slits on the transparent common electrode; and applying and rubbing an alignment layer for aligning the liquid crystal layer on the transparent pixel electrode, wherein arrangement between the transparent common electrode and the transparent pixel electrode is regulated with respect to the data line to reduce light leakage and coupling phenomena without a light shielding region above the data line, one end of the transparent common electrode is arranged between the data line and the transparent pixel electrode, and a ratio ($L_3/L_1$) of a distance ($L_1$) between the data line and the transparent pixel electrode to a distance ($L_3$) between the data line and the transparent common electrode is within 0.75.

BRIEF DESCRIPTION OF THE DRAWINGS

FIG. 3A shows a simulation result of light transmittance around a data line in a conventional twisted nematic (TN) mode, and FIGS. 3B and 3C show simulation results of light transmittance around a data line when a rubbing direction is changed in the FFS mode.

DESCRIPTION OF THE PREFERRED EMBODIMENTS

Now, a preferred embodiment of the present invention will be described in detail with reference to the accompanying drawings.

Figure 1:
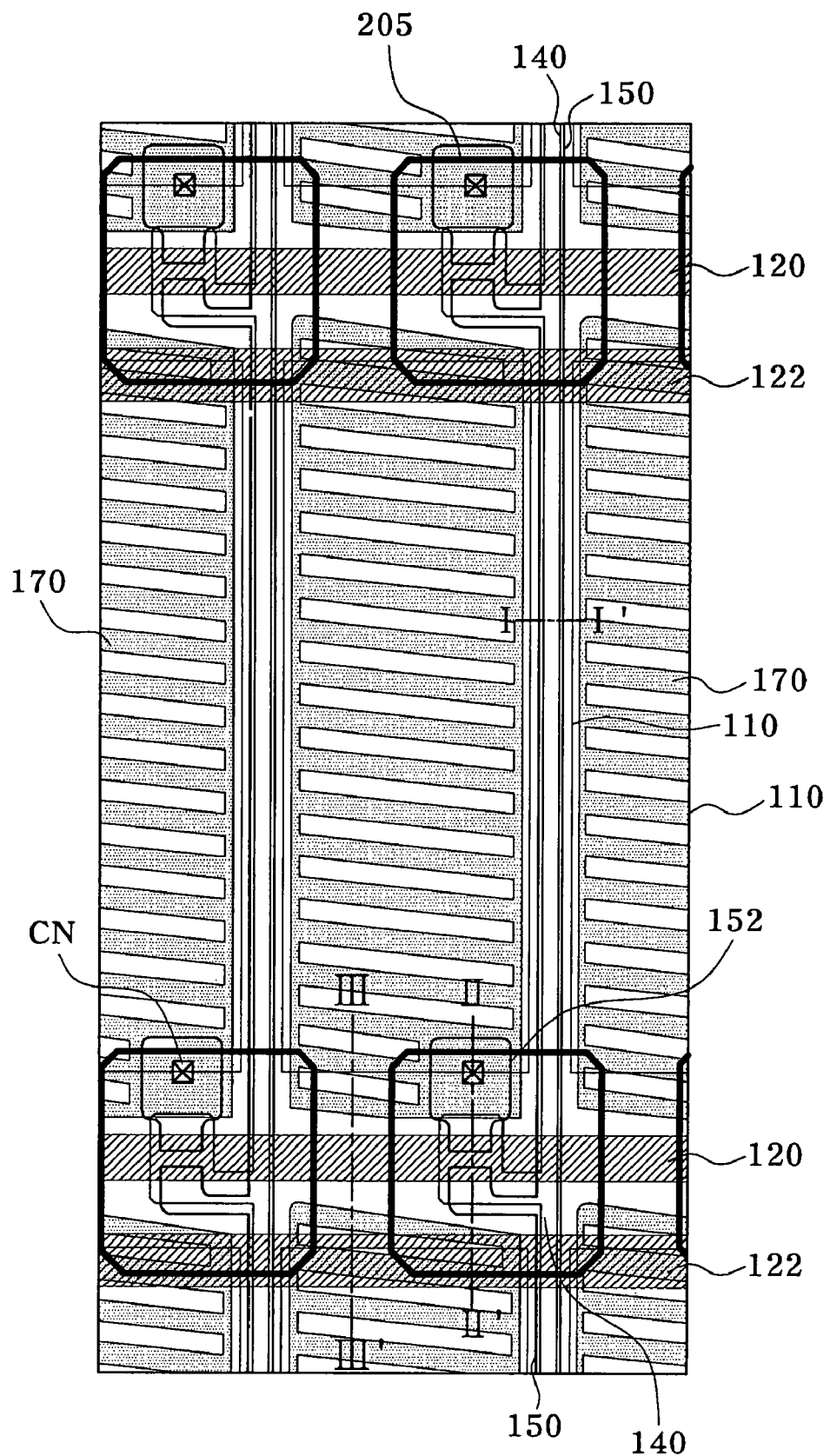
FIG. 1 is a partial plan view of a pixel area formed in a lower substrate of a liquid crystal display according to an exemplary embodiment of the present invention.
Figure 2A:
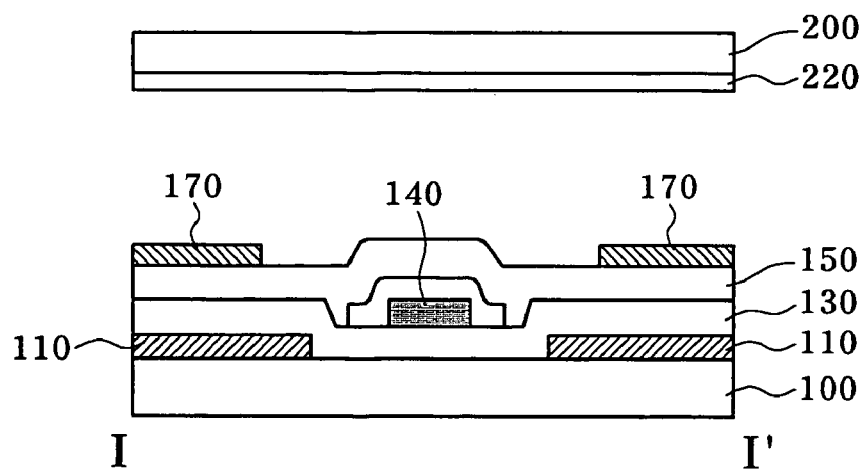
FIGS. 2A through 2C are cross-sectional views taken along lines I-I', II-II' and III-III' of FIG. 1, respectively, and FIG. 2D partially illustrates a transparent common electrode, a transparent pixel electrode and a data line in a fringe field switching (FFS) mode liquid crystal display of FIG. 1.
Figure 2B:
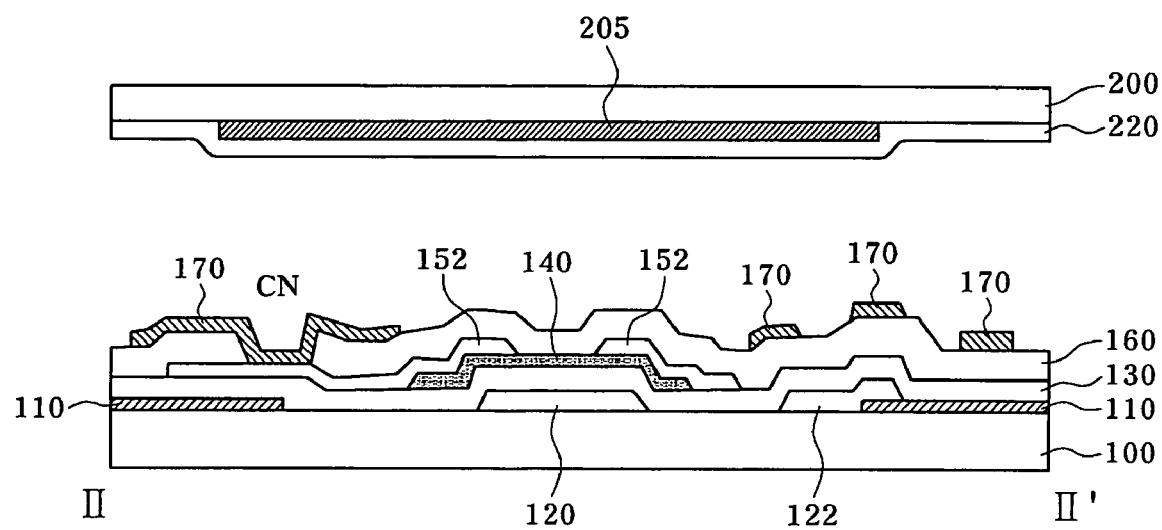
Figure 2C:
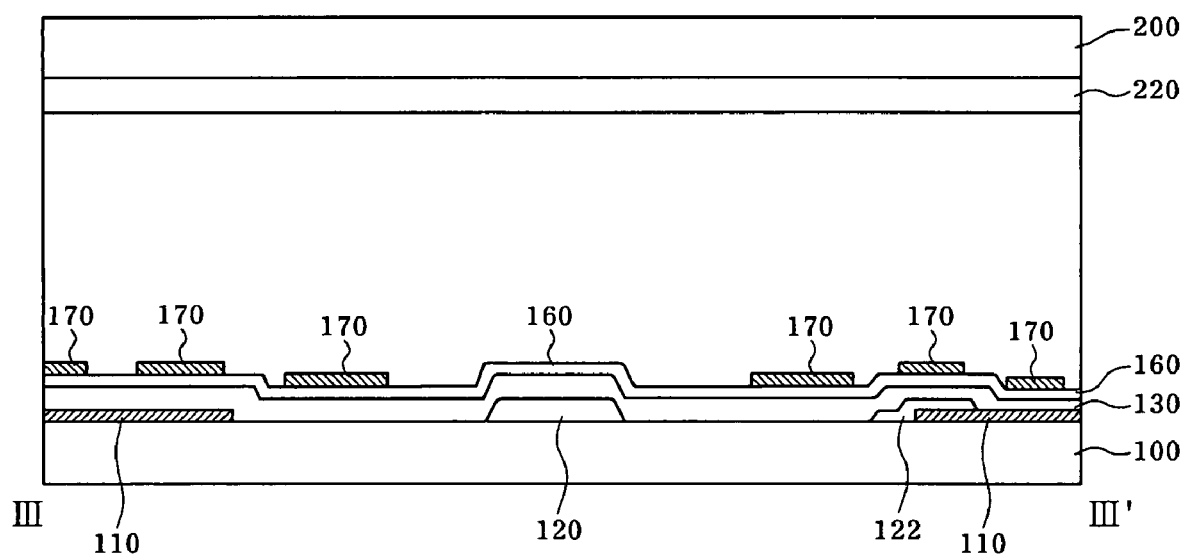

A liquid crystal display (LCD) according to an exemplary embodiment of the present invention includes a lower substrate, an upper substrate, and a liquid crystal layer interposed between the lower and upper substrates. In the lower substrate, electrodes intersect each other to apply a voltage to the liquid crystal layer, and pixels are defined by the electrodes. FIG. 1 is a partial plan view of a pixel area formed in a lower substrate of a liquid crystal display according to an exemplary embodiment of the present invention. FIGS. 2A through 2C are cross-sectional views taken along lines I-I', II-II' and III-III' of FIG. 1, respectively.

Referring to FIGS. 1, 2A, 2B and 2C, in the FFS, mode LCD according to an exemplary embodiment of the present invention, a gate line 120 and a data line 150 are arranged to intersect each other on a lower substrate 100; a thin film transistor (TFT) is arranged at an intersection between the gate line 120 and the data line 150 as a switching element; and a transparent common electrode 110 and a transparent pixel electrode 170 including a plurality of slits having a predetermined angle with respect to the gate line 120 are arranged in a unit pixel area defined by the gate line 120 and the data line 150, and are spaced apart from each other with an interlayer insulating layer 160 interposed therebetween. In FIG. 1, the transparent common electrode 110 is manufactured in a plate shape, but not limited thereto. Alternatively, the transparent common electrode 110 may include a plurality of slits.

Figure 2D:
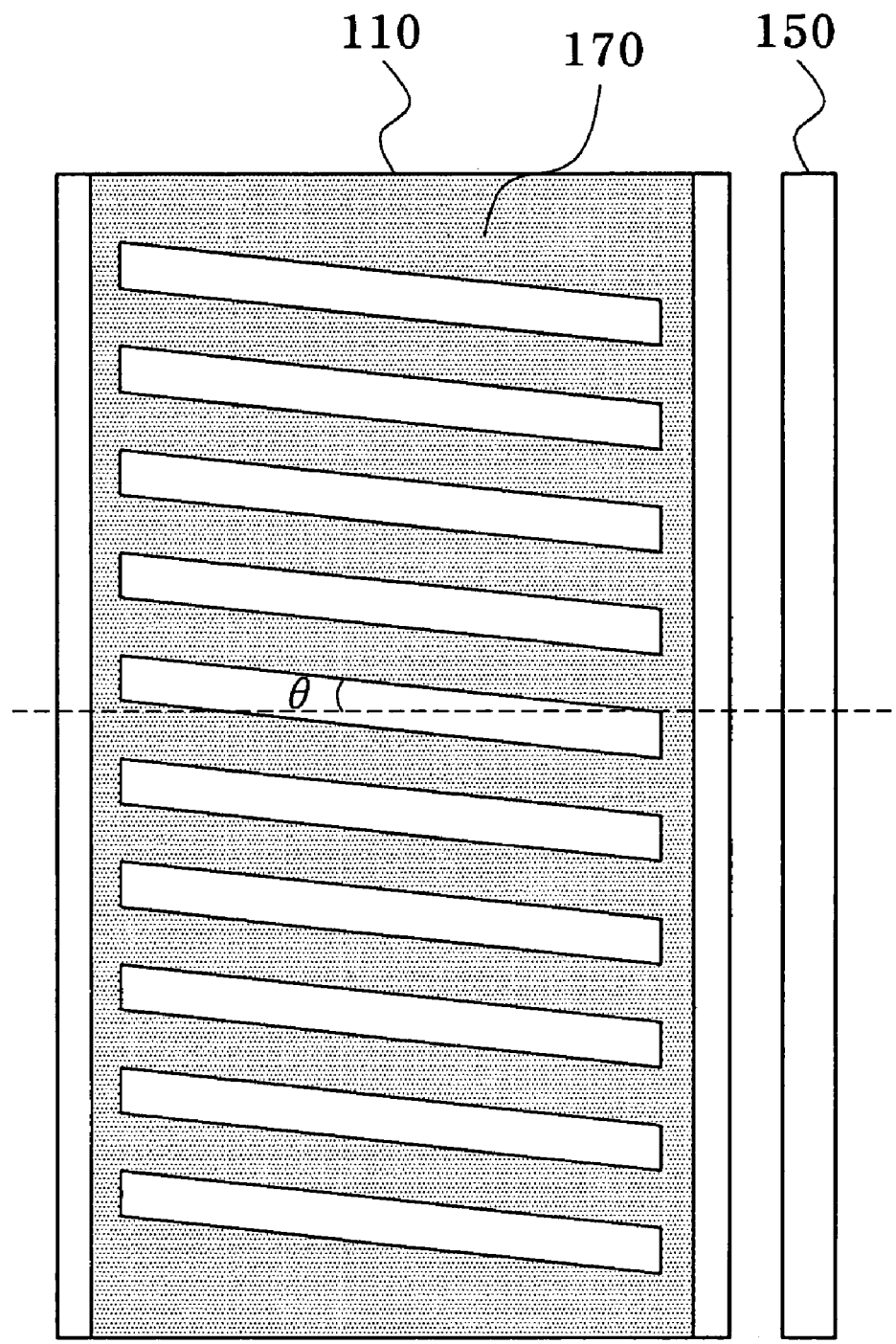

FIG. 2D illustrates only the transparent common electrode 110, the transparent pixel electrode 170 and the data line 150 in the FFS mode LCD. Here, the slits of the transparent pixel electrode 170 have a predetermined angle θ with respect to the gate line 120. Further, the transparent common electrode 110 and the transparent pixel electrode 170 are insulated from each other by the interlayer insulating layer 160. Also, a gate insulating layer 130 is provided between the gate line 120 and an active layer 140.

Meanwhile, a common bus line 122 parallel to the gate line 120 is arranged in a pixel edge part spaced from the gate line 120. The common bus line 122 is electrically connected to the transparent common electrode 110 and continuously transmits a common signal to the transparent electrode 110.

Above the lower substrate 100, the upper substrate 200 is provided spaced from the lower substrate 100 by a predetermined distance. The upper substrate 200 includes a light shielding region 205, a color filter (not shown) and an overcoat 220. The upper substrate 200 is adhered to the lower substrate 100 with a liquid crystal layer (not shown) having a plurality of liquid crystal molecules interposed therebetween.

A manufacturing method of the liquid crystal display according to an exemplary embodiment of the present invention will now be described with reference to FIGS. 1, 2A, 2B and 2C.

First, a transparent conductive layer is deposited on a lower substrate 100 and then patterned to form a transparent common electrode 110.

Then, an opaque metal is deposited on the transparent common electrode 110 and then patterned to form a gate line on one side of the transparent common electrode 110, and a common bus line 122 is formed to partially cover the transparent common electrode 110 (refer to FIG. 2B)

A gate insulating layer 130 is deposited on the entire surface of the lower substrate 100 having the patterned transparent common electrode 110, the gate line 120 and the common bus line 122. Then, an a-Si layer and an n+ a-Si layer are successively deposited on the gate insulating layer 130 above the gate line 120 and patterned to form an active layer 140.

Further, a metal layer is deposited on the entire surface of the lower substrate 100 having the patterned active layer 140, and then patterned to form a data line 150 and a source-drain electrode 152. An interlayer insulating layer 160 is deposited on the lower substrate 100 having the data line 150 and the source-drain electrode 152.

Then, a contact hole CN is formed to partially expose the source-drain electrode 152, and a transparent conductive layer is deposited on the interlayer insulating layer 160. At this time, the transparent conductive layer is patterned to connect the source-drain electrode 152 and a transparent pixel electrode 170 through the contact hole CN and to form the transparent pixel electrode 170 having a slit shape.

In addition, a light shielding region 205 is formed on an upper substrate 200 corresponding to the pixel area. According to the present embodiment, the light shielding region 205 is formed on the upper substrate 200 corresponding to only a switching element. According to the related art, the light shielding region is formed above the gate line 120 and the data line 150. However, in this embodiment, the light shielding region is not formed on the upper substrate 200 corresponding to the data line 150 and/or the gate line 120. It can be easily appreciated that an aperture ratio increases as the light shielding region decreases.

Further, according to an exemplary embodiment of the present invention, a structure that the light shielding region is not formed above the data line will be described below.

In the FFS mode LCD of this embodiment, the transparent common electrode 110 and the transparent pixel electrode 170 including a plurality of slits control the alignment of the liquid crystal layer (not shown), thereby controlling the light transmittance of the LCD in the unit of a pixel.

Further, in the FFS mode LCD, there is no light shielding region on the upper substrate 200 above the data line 150 to enhance the aperture ratio. The light shielding region (e.g., black matrix) is used for preventing transmission of the light in the area where the liquid crystal molecules are not controlled, so that it is provided above the data line in the related art. However, in this embodiment, the light shielding region can be removed by the basic properties, a rubbing direction or the like of the FFS mode LCD. Meanwhile, shortcomings due to the removal of the light shielding region were overcome by optimally arranging the transparent common electrode 110 and the transparent pixel electrode 170 with respect to the data line 150.

FIG. 2A is a cross-sectional view of the data line 150. As shown in FIG. 2A, the transparent common electrode 110 is formed on the lower substrate 100; the gate insulating layer 130 is formed on the transparent common electrode 110; the data line 150 is formed on the gate insulating layer 130 while covering the active layer 140; and the interlayer insulating layer 160 and the transparent pixel electrode 170 are sequentially formed on the data line 150.

In FIG. 2A, the active layer 140 is covered with the data line 150, but the active layer 140 may be removed. Further, with the removal of the light shielding region, a high-reflective material or a curved part may be formed as a top layer, thereby increasing the reflectivity on a top surface of the data line 150. The curved part will be described later.

Further, a color filter (not shown), an overcoat layer 220 and an alignment layer (not shown) are formed on the upper substrate 200 corresponding to the lower substrate 100. Here, the light shielding region is not formed on the upper substrate 200.

Figure 3B:
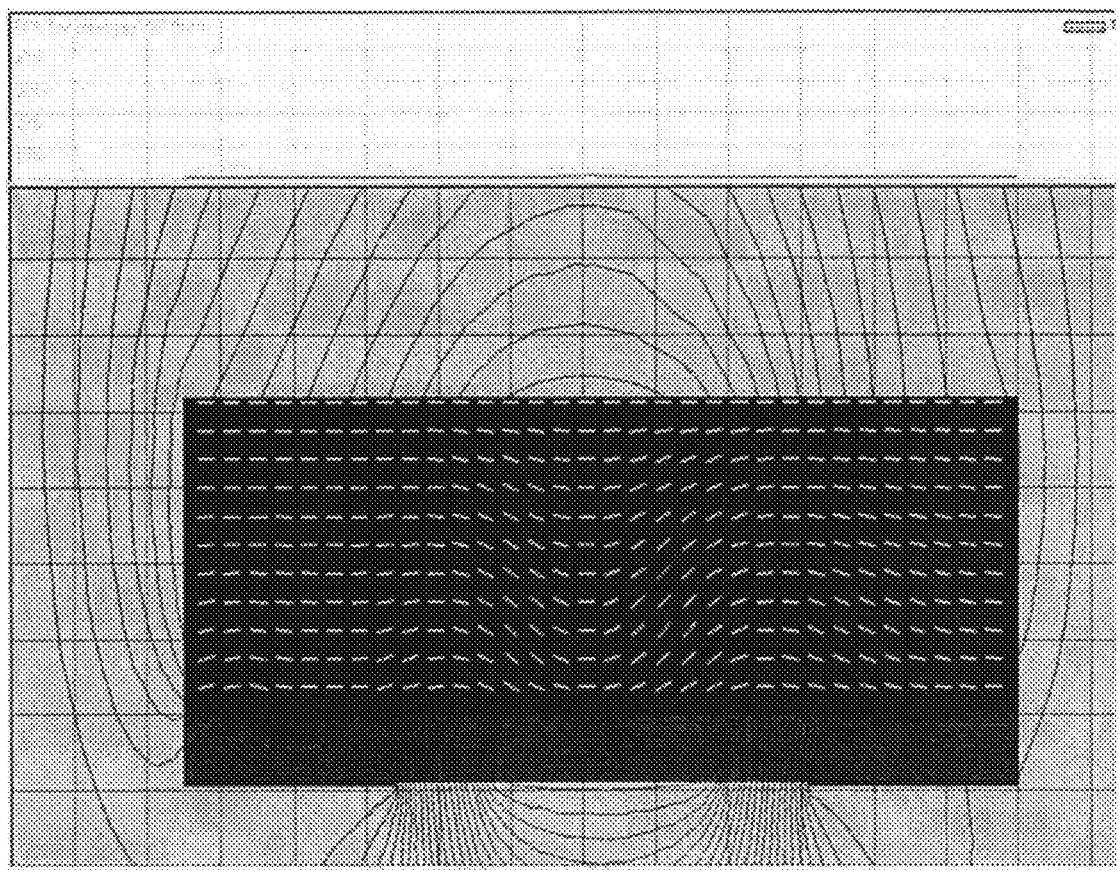

FIGS. 3A through 3C show simulation results of light transmittance around a data line in a conventional twisted nematic (TN) mode and the FFS mode, in which a common electrode and a pixel electrode are arranged around the data line.

First, FIG. 3A shows a simulation result of the light transmittance around the data line in the conventional TN mode. In FIG. 3A, the top graph shows light transmittance in a region corresponding to a lower region. Referring to FIG. 3A, a left pixel electrode receives power (on_state) and a right pixel electrode receives no power (off_state) with respect to the data line, and a rubbing direction of the liquid crystal is set to 45° as a typical rubbing direction.

Under the simulation condition of FIG. 3A, a common electrode is formed on an upper substrate provided with a color filter in the TN mode, and it is driven in a normally white mode. Thus, in the case of FIG. 3A, a left pixel electrode area should have a transmittance of 0 because it is an on_state, but a right pixel electrode area should have the maximum transmittance because it is an off_state. However, a voltage applied to the data line causes light leakage in an electrode edge part (see A in FIG. 3A) and an upper part of the data line.

Thus, in the TN mode, if the light shielding region is removed above the data line, the light leakage occurs around the data line. Therefore, the light shielding region should be formed above the data line. However, it will be easily appreciated that the light shielding region reduces the total aperture ratio.

On the other hand, the present inventors found that the light leakage is prevented regardless of the intensity of an electric field because the electric fields generated by a voltage difference between the data line, the pixel electrode and the common electrode have the same direction when the liquid crystal has a substantial rubbing direction of 0° with respect to the gate line in the FFS mode LCD according to the present invention.

FIGS. 3B and 3C show simulation results of the light transmittance around the data line when the rubbing directions are of 0 and 90° (with respect to the gate line) in the FFS mode, respectively. In FIGS. 3A through 3C, intervals between electrodes are the same.

Like FIG. 3A, in FIGS. 3B and 3C, the left pixel electrode and the right pixel electrode are set as the on_state and the off_state, respectively. In results, FIG. 3B shows that the transmittance approximately reaches 0 regardless of whether the pixel electrode is powered on or off. On the other hand, FIG. 3C shows that the light leakage occurs in the area B.

Particularly, the case of FIG. 3C can be explained as a case corresponds to the general in plane switching (IPS) mode because the IPS mode has the same electrode arrangement around the data line. In FIG. 3C, the rubbing direction of the liquid crystal is 90°, and the electric field generated by the voltage difference among the data line, the pixel electrode and the common electrode is 0°. Therefore, when electric potential difference is generated between the electrodes, the liquid crystal aligned at an angle of 90° is rotated to the electric field direction of 0°, so that the light leakage occurs (refer to B in FIG. 3C).

Referring to FIG. 3C, in the TN mode or the IPS mode (or at the rubbing direction of 90° in the FFS mode), the liquid crystal is undesirably rotated due to the electric field generated among the data line, the pixel electrode and the common electrode, so that the light leakage occurs and thus it is necessary to form the light shielding region above the data line even though no light leakage around the data line is required to remove the light shielding region above the data line. On the other hand, referring to FIG. 3B, if the rubbing direction of the liquid crystal is 0° in the FFS mode, the light leakage is prevented around the data line.

In the foregoing embodiment, the simulation is carried out under the condition that the rubbing direction of the liquid crystal is 0°, but not limited thereto. In practical use considering a driving voltage, a response time or the like, the light leakage around the data line is almost prevented if the rubbing direction of the liquid crystal ranges from 0° to 5°. Further, in consideration of a process margin, the rubbing direction preferably ranges from 0° to 2°. More preferably, the rubbing direction is 0°.

Figure 4:
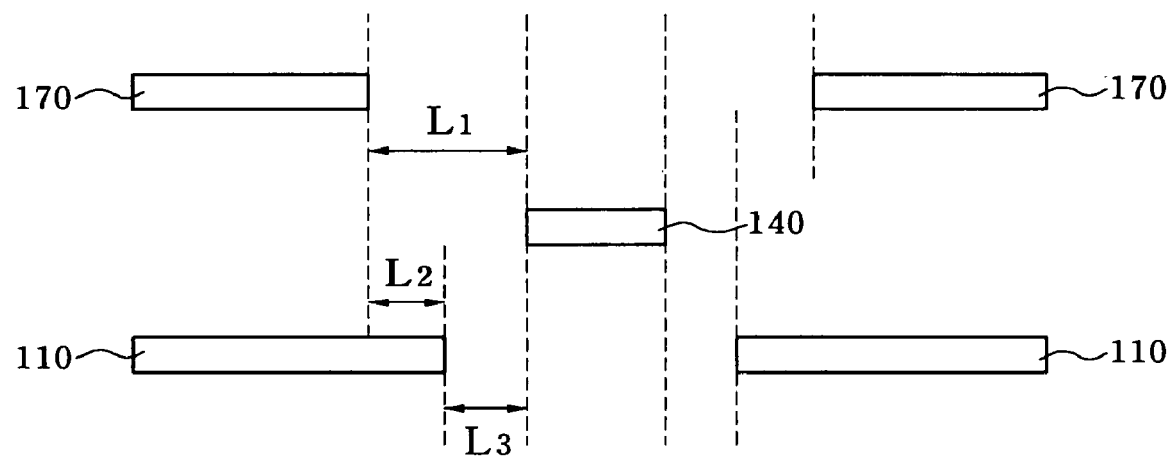
FIG. 4 is a schematic view for describing a coupling phenomenon depending on arrangement among a data line, a transparent pixel electrode and a transparent common electrode in the liquid crystal display according to an exemplary embodiment of the present invention.
Figure 5A:
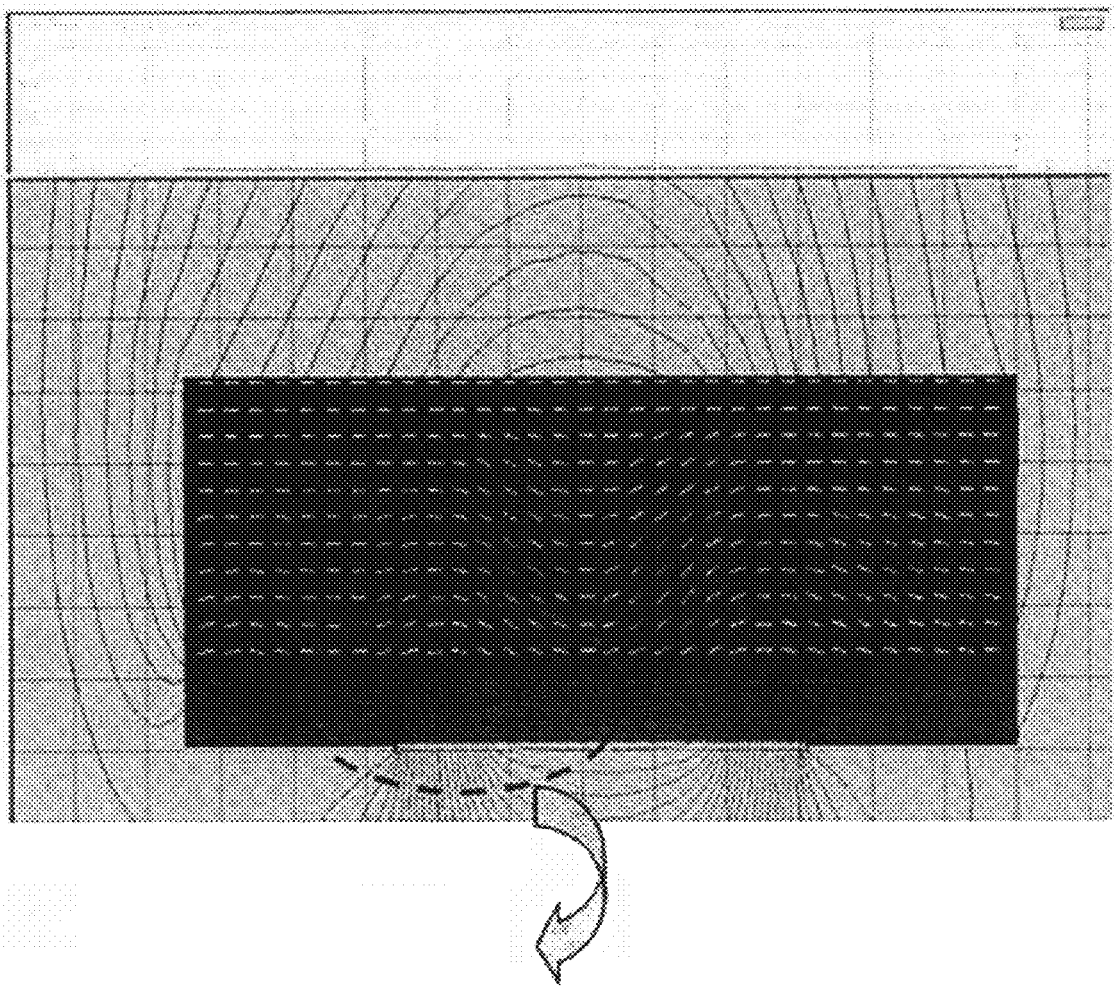
FIGS. 5A and 5B are simulation results illustrating coupling phenomena depending on arrangement among the data line, the transparent pixel electrode and the transparent common electrode in the liquid crystal display according to an exemplary embodiment of the present invention.
Figure 5A:
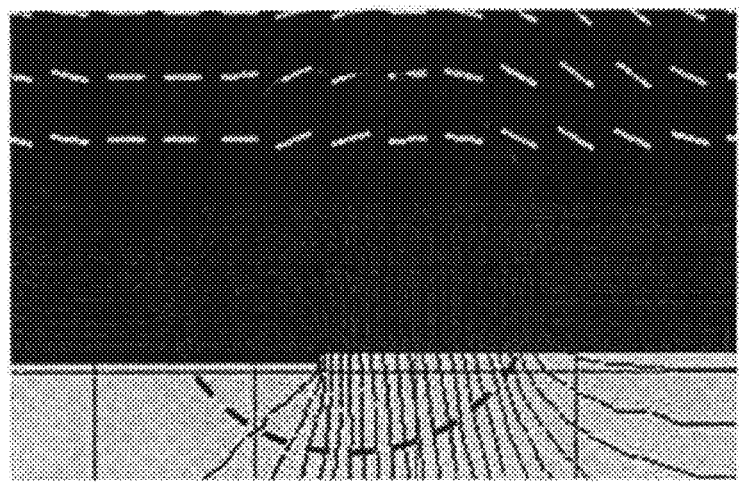
Figure 5B:
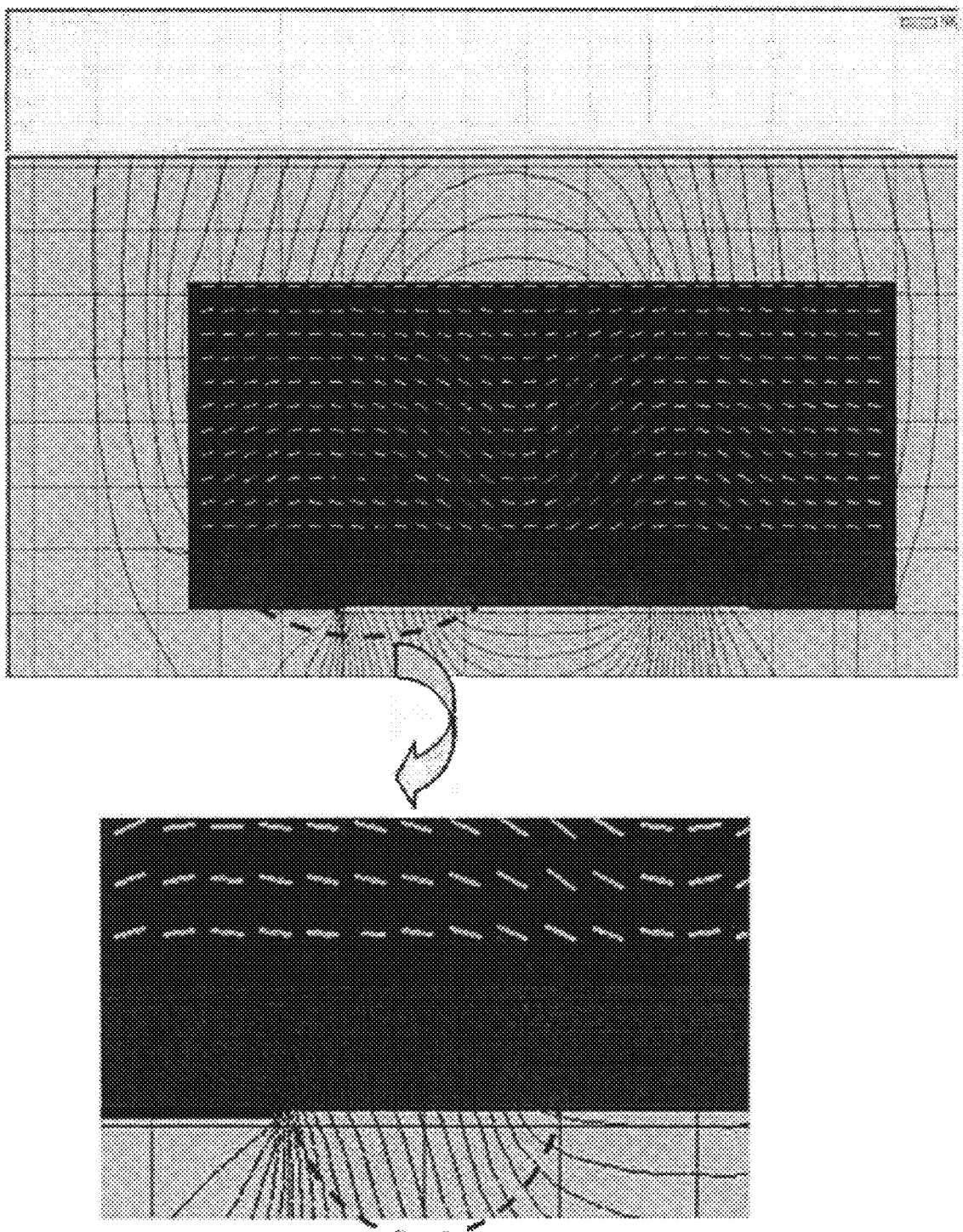

FIG. 4 is a schematic view for describing a coupling phenomenon depending on arrangement among a data line, a transparent pixel electrode and a transparent common electrode in a liquid crystal display according to an exemplary embodiment of the present invention, and FIGS. 5A and 5B show simulation results illustrating coupling phenomena depending on arrangement among the data line, the transparent pixel electrode and the transparent common electrode in the liquid crystal display according to an exemplary embodiment of the present invention.

In FIG. 4, $L_1$ denotes a distance between the data line 150 and the transparent pixel electrode 170; $L_3$ denotes a distance between the data line 150 and the transparent common electrode 110; and $L_2$ denotes a distance by which one end E of the transparent common electrode 110 is more extended than the transparent pixel electrode 170 toward the data line 150. Therefore, $L_1=L_2+L_3$.

Among the electrodes that generate the electric fields, the transparent common electrode 110 has a stable voltage level, so that a constant voltage difference is maintained even though an electric field is generated in the data line 150 or the transparent pixel electrode 170. Thus, the transparent common electrode 110 has a small effect on the deterioration of the picture quality. However, a voltage applied to the data line 150 or the transparent pixel electrode 170 freely varies according to pictures, so that the coupling phenomenon based on the electric field generated between two electrodes may deteriorate the picture quality.

According to the present embodiment, one end E of the transparent common electrode 110 is designed to be positioned between the transparent pixel electrode 170 and the data line 150, so that an electric field between the transparent pixel electrode 170 and the data line 150 is directly formed, thereby decreasing the phenomenon introducing an unstable liquid crystal alignment. As the transparent common electrode 110 is positioned between the transparent pixel electrode 170 and the data line 150, the transparent common electrode 110 serves as a medium to cancel the electric field so that the direct electric field is not formed between the transparent pixel electrode 170 and the data line 150. That is, the direct electric field is not formed between the transparent pixel electrode 170 and the data line 150 in the state that the light shielding region is removed above the data line 150, and the transparent common electrode 110 having a constant voltage level is positioned in the middle between the transparent pixel electrode 170 and the data line 150, so that a constant electric field is formed, thereby preventing the picture quality from deteriorating due to non-uniform coupling.

Then, an optimum condition for positioning one end E of the transparent common electrode 110 between the data line 150 and the transparent pixel electrode 170 will be described with reference to simulation results of FIGS. 6A through 6C.

Figure 6A:
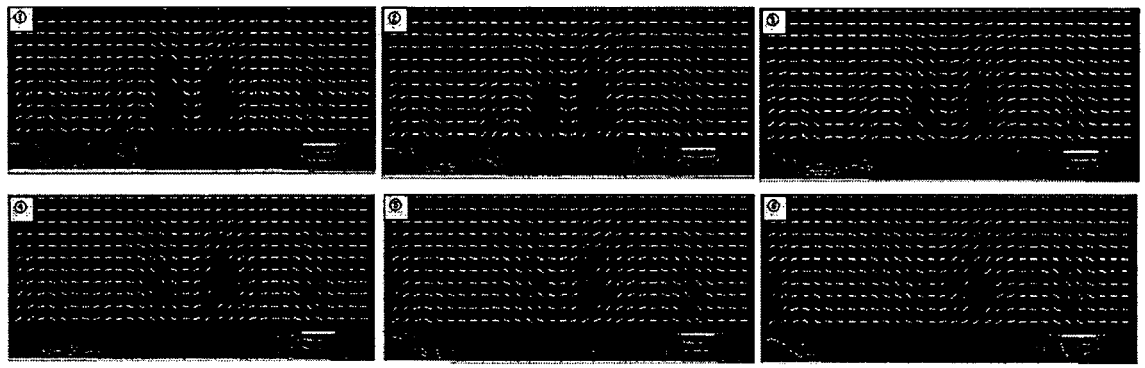
FIGS. 6A through 6C show simulation results for obtaining an optimum condition where one end of the transparent common electrode is arranged between the data line and the transparent pixel electrode according to an exemplary embodiment of the present invention.
Figure 6B:
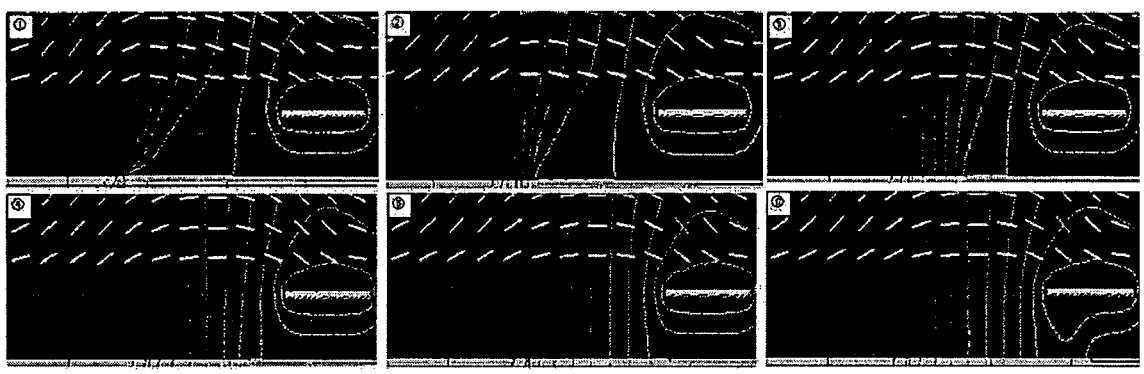
Figure 6C:
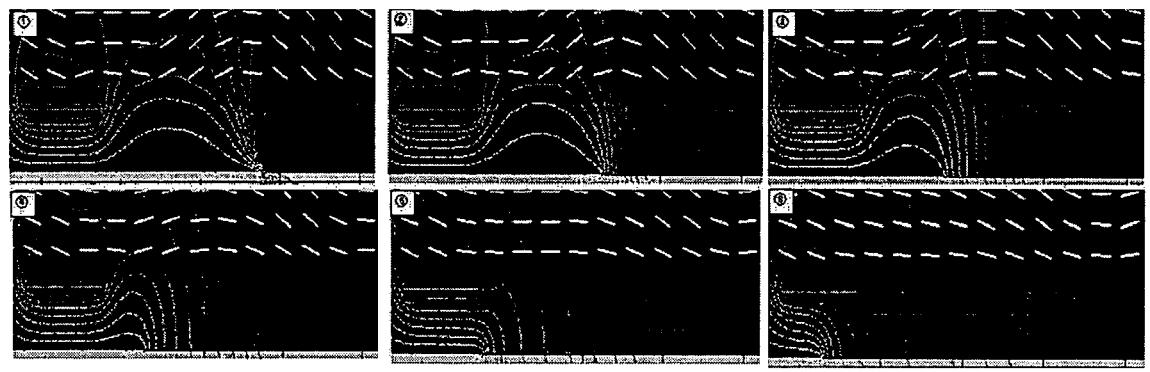

Referring to FIGS. 6A through 6c, views ① through ⑥ show the simulation results according to the following $L_1$ and $L_3$. For example, ① $L_1=4$ μm and $L_3=0$ μm, ② $L_1=4$ μm and $L_3=1$ μm, ③ $L_1=4$ μm and $L_3=2$ μm, ④ $L_1=4$ μm and $L_3=3$ μm, ⑤ $L_1=4$ μm and $L_3=4$ μm, and ⑥ $L_1=4$ μm and $L_3=5$ μm.

In the simulation results of FIG. 6A, the right is an off_state and the left is an on_state with respect to the data line. In FIG. 6B, the right is an off_state and the left is an off_state with respect to the data line. In FIG. 6C, the right is an on_state and the left is an on_state with respect to the data line.

As shown in FIGS. 6A through 6C, to eliminate the coupling effect at both the on_state and the off_state, the distance $L_3$ between the data line 150 and the transparent common electrode 110 should range from 0 to 3 μm under the condition that the distance $L_1$ between the data line 150 and the transparent pixel electrode 170 is 4 μm.

Thus, the distance $L_3$ between the data line 150 and the transparent common electrode 110 varies in the same rate as the distance $L_1$ between the data line 150 and the transparent pixel electrode 170. In other words, if $L_3/L_1=L$, $L(L_3/L_1)$ may range from 0 to 075.

According to an exemplary embodiment of the present invention, in the FFS mode, the light leakage due to voltage variation of the data line 150 does not occur even though the light shielding region above the data line 150 is removed. However, if the transparent pixel electrode 170 and the data line 150 overlap each other, the coupling between the electrodes occurs and causes data signal delay, vertical cross-talk, and deteriorated picture quality such as shot-mura due to increased parasitic capacitance (Cpd).

Accordingly, while minimizing these phenomena and considering the process capability, it is preferable to set a minimum design rule for preventing the transparent pixel electrode 170 and the data line 150 from overlapping each other. Contrarily, if the distance $L_1$ between the data line 150 and the transparent pixel electrode 170 is too large, the area where the liquid crystal molecules are not controlled is increased, so that picture quality is deteriorated. It is preferable but not necessary that the distance $L_1$ between the data line 150 and the transparent pixel electrode 170 is within 4 µm.

Because the optimum alignment tolerance required for designing is about 1.5 µm, the distance $L_1$ between the data line 150 and the transparent pixel electrode 170 is designed to 1.5 µm even if the distance $L_1$ is wanted to be 0. Alternatively, the process carried out according to designed values may differ from alignment in the process.

According to the present embodiment, after the light shielding region above the data line is removed, the exposed data line is additionally improved in reflectivity, so that the aperture ratio and the outdoor readability of the LCD can be further enhanced.

To this end, metal exposed on the top surface of the data line should have high reflectivity and inner reflectivity based on the data line should be increased to enhance the outdoor readability. To increase the inner reflectivity, it is preferable but not necessary that the data line has a curved shape to reflect incident light from the data line toward the inside.

Figure 7A:
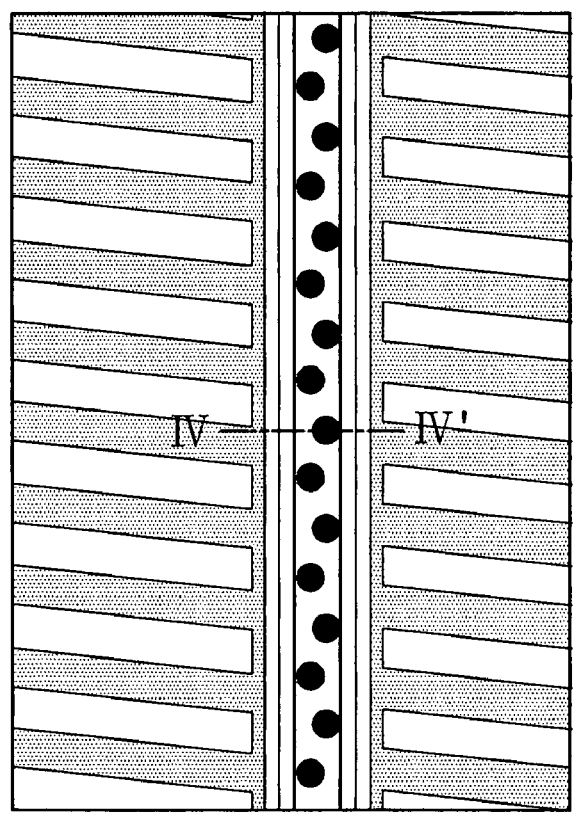
FIG. 7A is a partial plan view of the data line having a curved shape for increasing internal reflection in the data line according to an exemplary embodiment of the present invention.
Figure 7B:
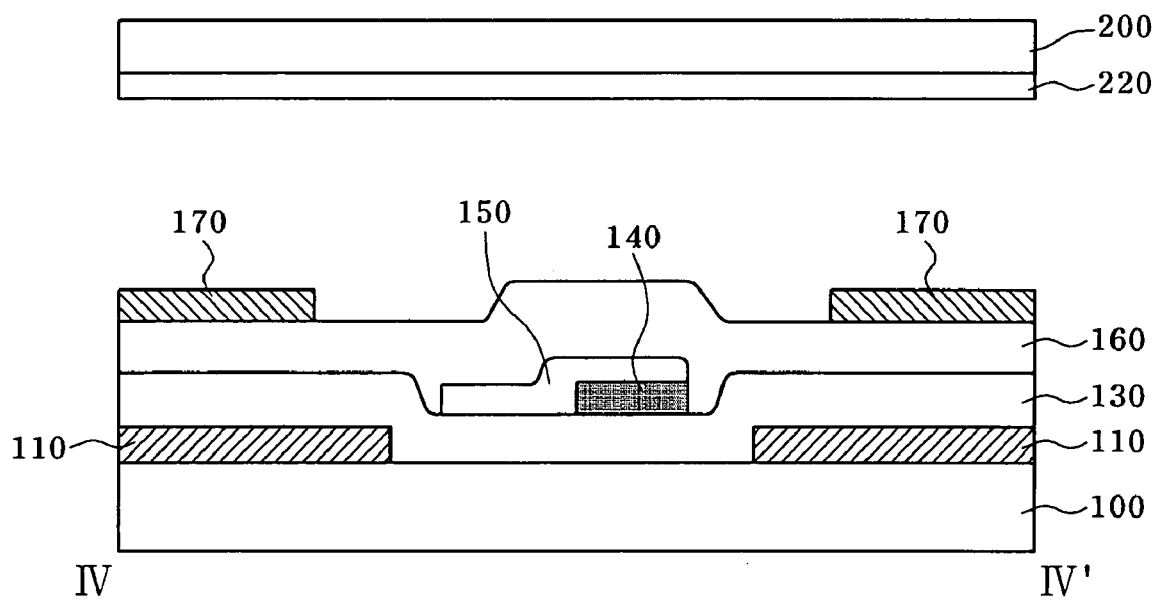
FIG. 7B is a cross-sectional view taken along line IV-IV' of FIG. 7A.

FIG. 7A is a partial plan view of a data line having a curved (embossing) shape for increasing internal reflection in the data line according to an exemplary embodiment of the present invention, and FIG. 7B is a cross-sectional view taken along line IV-IV' of FIG. 7A.

Referring to FIGS. 7A and 7B illustrating a cross-section of an active layer 140 and a data line 150 in the state the data line 150 and the active layer 140 are formed in a double-layered structure, a transparent common electrode 110 is formed on a lower substrate 100; a gate insulating layer 130 is formed on the transparent common electrode 110; the data line 150 is formed on the gate insulating layer 130 while covering the active layer 140; and an interlayer insulating layer 160 and a transparent pixel electrode 170 are formed on the data line 150 in sequence.

In FIG. 7B, the active layer 140 is covered with the data line 150, and this structure can effectively reduce delay of a signal transmitted through the data line 150. Further, the active layer 140 is patterned to have an active layer pattern 145 that includes a plurality of separated closed curves such as a circle, an ellipse, or the like. Thus, the data line 150 formed on the active layer pattern 145 can have a curved shape to thereby increase the internal reflectivity.

The curved shape of the data line 150 can be simply achieved by the double-layered structure of the active layer pattern 145 and the data line 150 without any additional process. In other words, the internal reflectivity can be increased while the process for the general transmissive FFS mode LCD is not largely changed but is maintained. With the structure that the light shielding region is not formed above the data line 150, the curved shape of the data line 150 can remarkably enhance the aperture ratio and the outdoor readability.

Meanwhile, on an upper substrate 200 corresponding to the lower substrate 100, an overcoat layer 220 is formed but a light shielding region is not formed.

Figure 8:
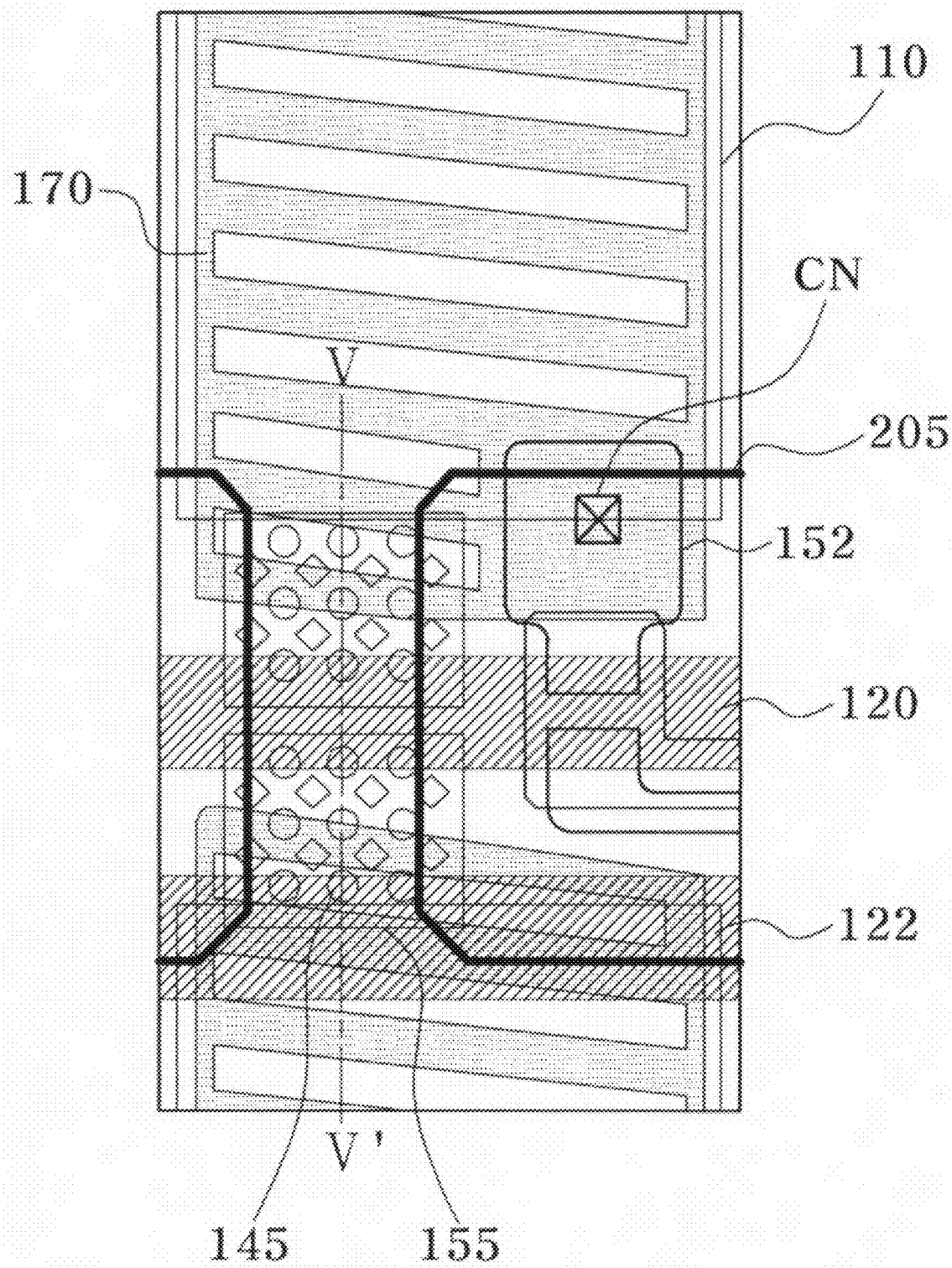
FIG. 8 is a partial plan view of a gate line in the pixel area formed in the lower substrate of the liquid crystal display according to an exemplary embodiment of the present invention.
Figure 9:
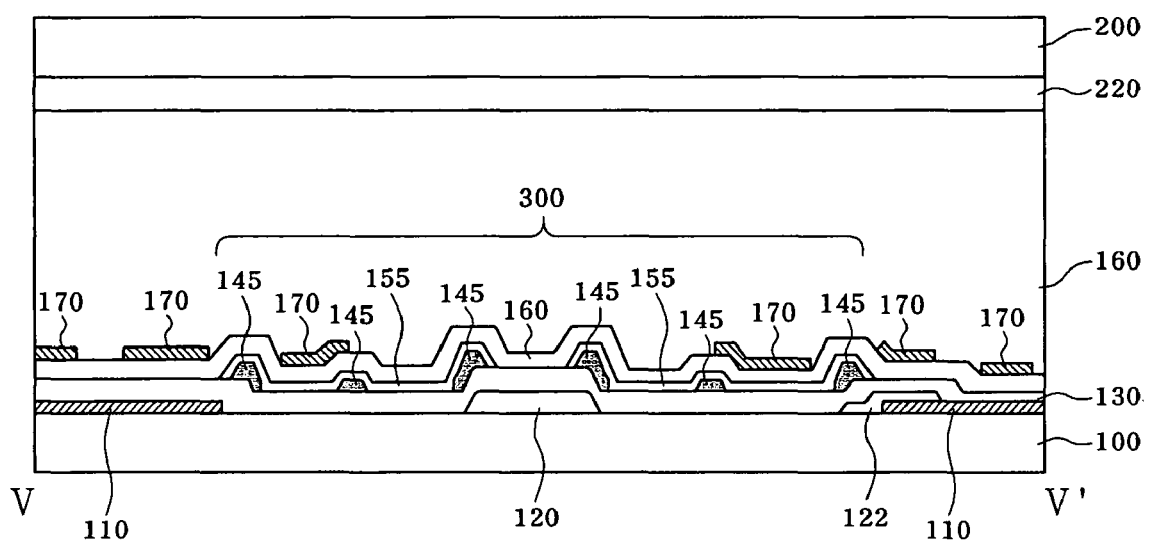
FIG. 9 is a cross-sectional view taken along line V-V' of FIG. 8.

FIG. 8 is a partial plan view of a gate line in a pixel area formed in a lower substrate of a liquid crystal display according to an exemplary embodiment of the present invention, and FIG. 9 is a cross-sectional view taken along line V-V' of FIG. 8.

To enhance the outdoor readability by improving the internal reflectivity, the light shielding region above the gate line 120 is removed and a reflective structure 300 is formed.

The reflective structure 300 covers the gate line 120. The reflective structure 300 is made of the same material as the data line 150 but electrically insulated from the data line 150. It is preferable but not necessary that a material of the active layer is used for giving the curved shape to the reflective structure 300.

The curved shape is achieved by forming the active layer pattern 145 that includes a plurality of separated closed curves such as a circle, an ellipse, or the like, and then covering the active layer pattern 145 with a data line pattern 155 as the reflective structure 300, thereby increasing the internal reflectivity. That is, the curved shape of the data line 150 can be more effectively achieved by the double layered structure of the active layer pattern 145 and the data line pattern 155. Thus, the light shielding region is not formed above the gate line 120, and the data line pattern 155 for the reflective structure has the curved shape, thereby remarkably enhancing the outdoor readability.

With this configuration, the internal reflectivity may be increased while the process for the general transmissive FFS mode LCD is not largely changed but is maintained, so that this structure is advantageous because additional development is not required.

In addition, it is preferable but not necessary that the reflective structure 300 is divided into two areas with respect to the gate line 120, which is electrically insulated. The gate line 120 may be made of an opaque metal, and thus the reflective structure 300 may be separated while exposing the gate line 120.

Meanwhile, a light shielding region 205 formed above the switching element partially covers the reflective structure 300, thereby securing the process margin.

The present invention has the following effects:

(1) According to one aspect of the present invention, an aperture ratio and internal reflectivity are enhanced, so that a transmissive FFS mode LCD is improved in outdoor readability and decreased in power consumption. For example, this structure is effective on a personal computer (PC), a notebook computer, personal digital assistant (PDA), a cellular phone, a display built-in a digital camera, and the like which are to be mainly used in an outdoor place.

(2) According to one aspect of the present invention, the features of the FFS mode, a rubbing direction of the liquid crystal, a transparent pixel electrode, a data line, and a transparent common electrode are optimally disposed to minimize the light leakage and the coupling phenomenon, so that an additional light shielding region is not required above the data line and the aperture ratio is remarkably enhanced.

(3) According to one aspect of the present invention, the data line is improved in its own reflectivity and has a predetermined curved shape in order to increase the internal reflectivity of incident light around the data line corresponding to no light shielding region with the structure that the additional light shielding region is not formed above the data line, thereby increasing the internal reflectivity.

(4) According to one aspect of the present invention, to manufacture the FFS mode LCD without a separate deposition process or the like, an active layer is patterned and then the data line is deposited on the patterned active layer, so that the data line has a curved shape, thereby easily increasing the internal reflectivity without a complicated change of the process.

(5) According to one aspect of the present invention, to improve the internal reflectivity and enhance the outdoor readability, the active layer is pattered into a plurality of separated closed curves and thus the reflective structure for the data line formed on the active layer can have the curved shape, while the light shielding region is not formed above the gate line and the reflective structure is formed as the data line, thereby readily increasing the internal reflectivity without a complicated change of the process.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A fringe field switching mode liquid crystal display comprising a lower substrate, an upper substrate, and a liquid crystal layer interposed between the lower and upper substrates, in which a gate line and a data line intersect each other and define a pixel area on the lower substrate and a switching element is provided at an intersection between the gate line and the data line, the fringe field switching mode liquid crystal display comprising:
   a transparent common electrode having a predetermined shape and formed within the pixel area to adjust light transmittance by applying a voltage to the liquid crystal layer, a transparent pixel electrode comprising a plurality of slits and formed above the transparent common electrode with an insulating layer interposed between the transparent common electrode and the transparent pixel electrode, and an active layer below the data line, wherein the active layer comprises a plurality of separated closed curve patterns to make the data line have a curved shape,
   wherein a rubbing direction for aligning the liquid crystal layer ranges within 5° with respect to a direction of the gate line,
   arrangement between the transparent common electrode and the transparent pixel electrode is regulated with respect to the data line to reduce light leakage and coupling phenomena without a light shielding region above the data line, and
   one end of the transparent common electrode is arranged between the data line and the transparent pixel electrode.

2. The fringe field switching mode liquid crystal display according to claim 1, wherein a ratio ($L_3/L_1$) of a distance ($L_1$) between the data line and the transparent pixel electrode to a distance ($L_3$) between the data line and the transparent common electrode is within 0.75.

3. The fringe field switching mode liquid crystal display according to claim 2, wherein the distance between the data line and the transparent pixel electrode is within 4 µm.

4. The fringe field switching mode liquid crystal display according to claim 1, wherein the rubbing direction for aligning the liquid crystal layer is within 2° with respect to the direction of the gate line.

5. The fringe field switching mode liquid crystal display according to claim 1, wherein the slits of the transparent pixel electrode are arranged at a predetermined angle to the gate line.

6. A fringe field switching mode liquid crystal display comprising a lower substrate, an upper substrate, and a liquid crystal layer interposed between the lower and upper substrates, in which a gate line and a data line intersect each other and define a pixel area on the lower substrate and a switching element is provided at an intersection between the gate line and the data line, the fringe field switching mode liquid crystal display comprising:
   a transparent common electrode having a predetermined shape and formed within the pixel area to adjust light transmittance by applying a voltage to the liquid crystal layer, a transparent pixel electrode comprising a plurality of slits and formed above the transparent common electrode with an insulating layer interposed between the transparent common electrode and the transparent pixel electrode, and an electrically independent reflective structure defined by the same material as the data line and formed on the gate line, and an active layer below the reflective structure, wherein the active layer comprises a plurality of separated closed curve patterns to make the reflective structure have a curved shape,
   wherein a rubbing direction for aligning the liquid crystal layer ranges within 5° with respect to a direction of the gate line,
   arrangement between the transparent common electrode and the transparent pixel electrode is regulated with respect to the data line to reduce light leakage and coupling phenomena without a light shielding region above the data line, and
   one end of the transparent common electrode is arranged between the data line and the transparent pixel electrode.

7. The fringe field switching mode liquid crystal display according to claim 6, wherein the reflective structure is separated into two areas with respect to the gate line.

8. A fringe field switching mode liquid crystal display comprising a lower substrate, an upper substrate, and a liquid crystal layer interposed between the lower and upper substrates, in which a gate line and a data line intersect each other and define a pixel area on the lower substrate and a switching element is provided at the intersection between the gate line and the data line, the fringe field switching mode liquid crystal display comprising:
   a transparent common electrode having a predetermined shape and formed within the pixel area to adjust light transmittance by applying a voltage to the liquid crystal layer, and a transparent pixel electrode comprising a plurality of slits and formed above the transparent common electrode with an insulating layer interposed between the transparent common electrode and the transparent pixel electrode,
   wherein a light shielding region is removed above the data line and the gate line, and
   an electrically independent reflective structure is defined by the same material as the data line and formed on the gate line, and
   an active layer below the reflective structure, wherein the active layer comprises a plurality closed curve patterns to make the reflective structure have a curved shape.

9. The fringe field switching mode liquid crystal display according to claim 8, wherein a rubbing direction for aligning the liquid crystal layer is within 2° with respect to a direction of the gate.

10. The fringe field switching mode liquid crystal display according to claim 8, wherein the reflective structure is separated into two areas with respect to the gate line.

11. The fringe field switching mode liquid crystal display according to claim 8, wherein a ratio ($L_3/L_1$) of a distance ($L_1$) between the data line and the transparent pixel electrode to a distance ($L_3$) between the data line and the transparent common electrode is within 0.75.

* * * * *

UNITED STATES PATENT AND TRADEMARK OFFICE
CERTIFICATE OF CORRECTION

| | | |
|---|---|---|
| PATENT NO. | : 7,982,839 B2 | Page 1 of 1 |
| APPLICATION NO. | : 11/725952 | |
| DATED | : July 19, 2011 | |
| INVENTOR(S) | : Suk Choi et al. | |

It is certified that error appears in the above-identified patent and that said Letters Patent is hereby corrected as shown below:

Column 12, Line 12, Claim 6, before "an" delete "and"

Column 12, Line 51, Claim 8, after "plurality" insert -- of separated --

Column 12, Line 56, Claim 9, after "gate" insert -- line --

Signed and Sealed this
Fifteenth Day of November, 2011

David J. Kappos
*Director of the United States Patent and Trademark Office*